United States Patent [19]

Howie, II

[11] Patent Number: 5,791,605
[45] Date of Patent: Aug. 11, 1998

[54] RAILROAD SIGNALING METHOD AND APPARATUS

[76] Inventor: Thomas D. Howie, II, 503 Greenville St., Abbeville, S.C. 29620

[21] Appl. No.: 798,936

[22] Filed: Feb. 11, 1997

[51] Int. Cl.$^6$ .................................................. B61L 5/00
[52] U.S. Cl. ................ 246/474; 246/477; 116/63 P; 359/551
[58] Field of Search .................... 246/474, 475, 246/477, 484, 488, 473.3, 473, 207, 20; 116/63 P, 63 T, 63 C; 362/362; 359/551, 552

[56] References Cited

U.S. PATENT DOCUMENTS

| | | | |
|---|---|---|---|
| 1,837,184 | 12/1931 | Drillette | 246/475 |
| 2,561,173 | 7/1951 | Bompart | 116/63 P |
| 3,014,123 | 12/1961 | Mainzer | 116/63 P |
| 3,085,238 | 4/1963 | Lewis | 246/473 R |
| 3,544,960 | 12/1970 | Hayes | 246/473 |
| 3,834,789 | 9/1974 | Brudy | 116/63 P |
| 3,981,263 | 9/1976 | Capucio | 116/63 P |
| 4,157,531 | 6/1979 | Mont | 116/63 P |
| 4,430,638 | 2/1984 | Parker | 116/63 P |
| 5,208,585 | 5/1993 | Sprague | 116/63 T |
| 5,244,302 | 9/1993 | Ollivier | 116/63 P |

Primary Examiner—Mark T. Le
Attorney, Agent, or Firm—Isaf, Vaughan & Kerr

[57] ABSTRACT

A railroad signaling device for conveying information to a train engineer comprises a pylon adapted to be secured to a cross tie of the railroad track at a location to be passed over by a train as the train moves down the track. The pylon has front and rear faces that bear indicia fabricated of a retroflective material to reflect the train's headlight back in the direction of the engineer. The pylon is located along the railroad track to be easily detectable by an engineer, especially in fog or inclement weather when the engineer's attention is focused down the track ahead.

14 Claims, 2 Drawing Sheets

RAILROAD SIGNALING METHOD AND APPARATUS

TECHNICAL FIELD

This invention relates generally to the operation of trains and railroad lines and more specifically to methods of conveying information to train engineers as their trains move along the railroad track.

BACKGROUND OF THE INVENTION

In the operation of a railroad network, it is imperative that the engineers who drive and operate the trains be fully apprised of a wide variety of conditions as their trains move along the network of tracks. For example, an engineer needs to know of approaching track hazards, intersections, bridges, temporary slow or caution zones, whistle sounding requirements, and many other conditions. Further, the engineer has to be informed of such conditions in all weather and lighting environments and must be able to respond appropriately and in a timely manner.

In the past, information typically has been conveyed to engineers by posting signs along the sides of rail lines. Usually, these signs are of relatively standard construction including a steel sign post to which is bolted an aluminum plate with the appropriate indicia printed thereon. The sign usually is mounted high on its sign post to catch the attention of the engineer, who is customarily looking down the tracks and not to their sides.

While traditional railroad signs have been used successfully for many years, they nevertheless have a number of inherent problems and shortcomings. For example, their placement to the side of rail line on sign posts is generally effective during clear weather and during the day. In many cases, however, railroad engineers are faced with inclement weather including rain, fog, and snow. In these conditions, and particularly in the case of fog, the engineer may not see a sign on the side of the rail line. This is not only because the sign is obscured by the fog, but also because during conditions of fog or other inclement weather, an engineer's attention and concentration is focused down the track ahead and not to its side. The combination of these conditions increases the likelihood that a sign will be missed.

Another problem with rail side signs is that they are expensive and labor intensive to manufacture, install, and maintain. While this may be acceptable for permanent signs and signals, it is quite a problem in the case of temporary indicators such as notice of a rail maintenance crew or a temporary caution zone ahead. For these temporary conditions, a crew must take the time and invest the resources to erect a sign post and install a sign thereon only to be required to remove and store it a short time later. Obviously, this is an inefficient process and the result is still a rail side sign that may be missed in inclement weather. In fact, it is usually necessary to post two signs; one on one side of the track for trains moving in one direction and another on the other side for trains moving in the opposite direction. Further, it has been found that erection of traditional signs is dangerous and instances of injury as a result of falling from a ladder or as a result of a falling sign plate are not uncommon.

Thus, there exists a need for an improved method and apparatus for conveying information to a train engineer that avoids the problems of prior art signs and methods, that is clearly visible and catches the engineer's attention even in fog and inclement weather, and that is economical and convenient to install and remove for informing of temporary conditions. It is to the provision of such a method and apparatus that the present invention is primarily directed.

SUMMARY OF THE INVENTION

The present invention, in one preferred embodiment thereof, comprises a signaling device for conveying information to the engineer of a train as the train moves along a railroad track. The device comprises a tent shaped pylon formed of a weather resistant plastic material and having angled front and back faces. The pylon has a base and extends to a height that is less than the distance between the bottom of a train and the railroad line on which it moves. Each of the faces of the pylon is provided with visual indicia, which preferably is made of retroreflective material that reflects the headlight of the train directly back in the direction of the train. In use, the pylon is located on the railroad track so that the train passes over the pylon as it moves down the track. In this regard, one embodiment of this invention is mounted by screws extending through its base to a cross tie between the rails of the track in the center of the rail line. In another embodiment, the pylon can be mounted outside the tracks on the end portion of a cross tie. In any event, the train passes over the pylon.

In inclement weather, the signaling device of this invention is not missed by the engineer because it is located directly down the tracks where his attention is focused. The retroreflective material makes the device highly visible, even in fog, and a single pylon can indicate the beginning of a zone in one direction and the end of the zone in the other. The invention is inexpensive to manufacture, quick and easy to install, and is uniquely suited for indicating the presence of a temporary work or caution zone because it can be removed just as easily as it is installed.

These and other features and advantages of this invention will become more apparent upon review of the detailed description set forth below when taken in conjunction with the accompanying drawings, which are briefly described as follows.

DETAILED DESCRIPTION OF THE PREFERRED EMBODIMENT

Figure 1:
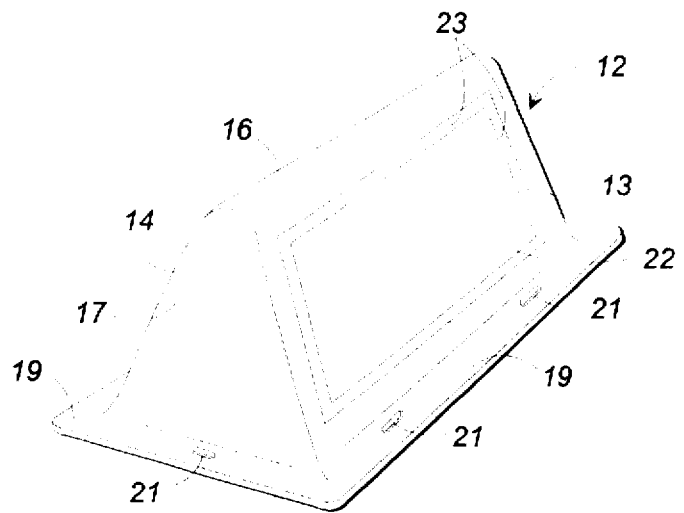
FIG. 1 is a perspective illustration of a railroad signaling device that embodies principles of this invention in a preferred form.

Referring now to the drawings, in which like numerals refer to like parts throughout the several views, FIG. 1 illustrates the railroad signaling device of this invention in a preferred embodiment. The device 11 comprises a pylon 12 that is molded or formed of a weather resistant material such as, for example, plastic. The pylon 12 is generally tent shaped with a front face 13 and a rear face 14 that are angled upwardly and are joined at a common apex portion 16 of the pylon. The pylon is closed at one end of the front and rear faces by a first end panel 17 and at the other end of the front and rear faces by and end panel 18 (not visible in FIG. 1). An outwardly projecting flange 19 extends about the bottoms of the front and rear faces and end panels and forms a base of the pylon for securing it in place as described in more detail below. The flange 19 can be provided with holes 21 through which mounting screws can extend.

In the preferred embodiment of FIG. 1, the pylon 12 is molded from a unitary piece of weather resistant plastic material such as ABS plastic. However, this should not be construed as a limitation of the invention since the pylon could be formed from a variety of materials and in a variety of ways including through assembly of individual plastic panels adhered together along their edges. In addition, the pylon could be formed as a solid block of weather resistant material and this configuration might be preferred in some cases where it is desired that the signaling device be heavy enough to anchor itself in place without attaching screws. Further, means other than a projecting flange and associated screws might be used to secure the device. For example, a downwardly projecting stake might be provided to anchor the pylon by being forced into the ground or the bed of a railroad track. Many variations of these features as well as variations of the shape of the pylon itself are contemplated by the present invention.

The front face 13 of the pylon is provided with indicia 22 that, in the embodiment of FIG. 1 comprises a field of retroreflective material surrounded by a contrasting retroreflective boarder 23. For example, the field could be red or green with the boarder being white or silver. Various colors have associated meanings in the railroad industry and convey information to engineers. For example, a red field with a silver boarder might indicate an approaching caution zone while a green field with a silver boarder might indicate the end of a caution zone. It has been found that a retroflective material known as diamond grade reflective material available from the 3M company function well; however, other materials may also be used for the indicia.

The rear face 14 (not visible in FIG. 1) preferably is also provided with indicia similar to that of the front face. For example, the front face may be provided with a red signal indicia while the rear face could be provided with a green signal indicia. In this way, the present invention can be used to convey one signal for trains moving in one direction down the track and to convey another signal for trains moving in the opposite direction down the track. In this example, for a train approaching the red signal face of the pylon, the beginning of a caution zone might be indicated while for a train approaching from the opposite direction, the end of the caution zone would be indicated by the green signal face.

Figure 2:
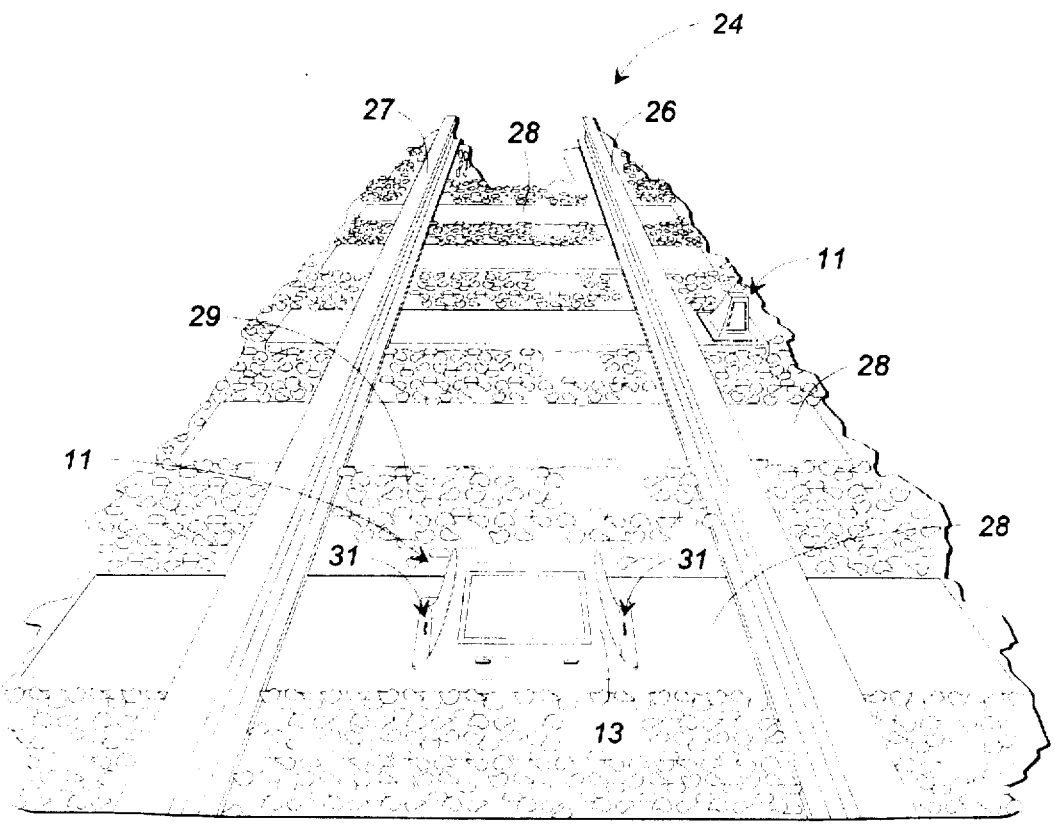
FIG. 2 is a view down a railroad track showing the method and preferred installations of the signaling device of this invention.

FIG. 2 illustrates the intended and preferred use of the signaling device of this invention for conveying information to railroad engineers. A typical railroad track 24 is illustrated and includes a right rail 26 and a left rail 26 supported atop spaced parallel cross ties 28. The cross ties, in turn, are supported in a bed of gravel 29 or other appropriate foundation material. A signaling device 11 according to this invention is shown secured with screws 31 to a cross tie 28 between the left and right rails of the track. The front face 13 faces up the track toward an oncoming train and is angled upwardly for better visibility. On the other side of the pylon, the rear face (not visible) faces down the track toward a train approaching from that direction.

The height of the pylon is predetermined to be less than the distance between the bottom of a train and the railroad track so that no portion of the train will impact and destroy the pylon as the train passes over it. In this regard, it is standard in the industry that trains be configured to provide a "dead zone" of at least three (3) inches above the tops of the rails into which no part of the train extends as the train passes. In such a case, the height of the pylon could be determined to be no taller than the rails plus three (3) inches. Alternatively, the height of the pylon could be about the same as the height of the rails of the track. Both 6½ and 9 inch tall rails are used in U.S. railroad tracks and an embodiment of this invention for use with either size rail is contemplated by and is within the scope of the invention.

It can be seen from FIG. 2 that as a train approaches from the perspective of the viewer of FIG. 2, the front face 13 of the pylon is visible to the engineer. Since the pylon is in the middle of the train track, it is very unlikely to escape the engineers attention since the engineer's attention is generally focused directly down the track ahead. This is particularly true in fog or other inclement weather conditions. The retroflective indicia of the signaling device reflects the very bright headlight of the train directly back at the engineer so that the signal is bright, clear, and unmistakable. Upon sighting the signal, the engineer can take the appropriate action depending upon the meaning of the signal. For example, if he sees a signal for a slow zone, he can slow down until he sights the next signal indicating the end of the slow zone. For a train approaching from the other direction, the same pylons can indicate the beginning and end of the slow zone.

FIG. 2 also illustrates a signaling device 11 attached to the end portion of a cross tie on the outside of the rails. This placement would also provide the advantages discussed above and represents an alternate method of carrying out the present invention. In addition, the signaling device of this invention could be anchored to the bed 29 with an appropriate spike or the like or could simple be weighted and placed on a cross tie or the bed where its weight would anchor it in place. In either case, the signaling device is positioned within the footprint of a train so that the train passes over the device as the train moves down the track.

Figure 3:
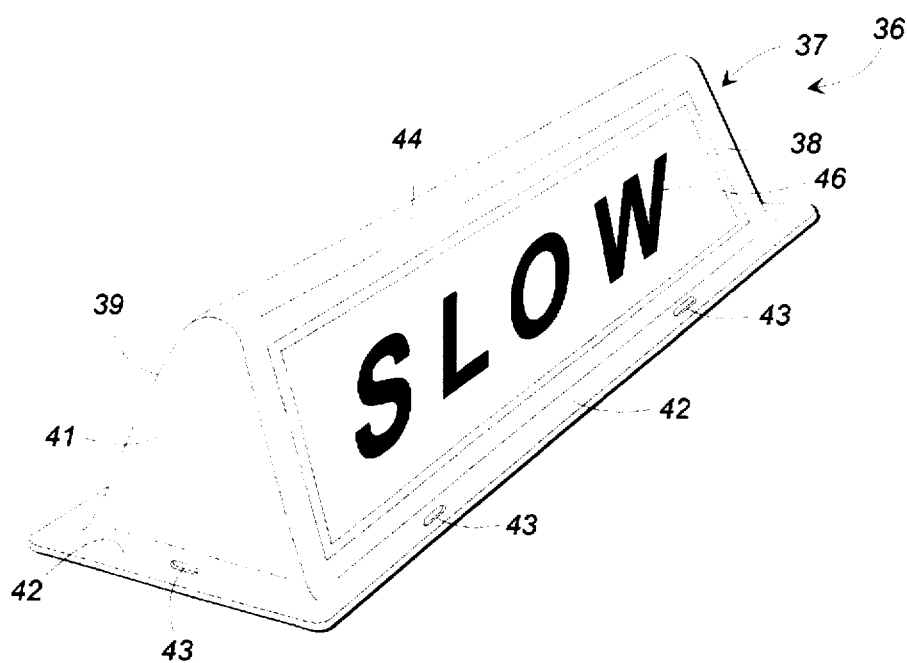
FIG. 3 is a perspective embodiment of the invention for conveying written messages to a train engineer.

FIG. 3 illustrates an alternate embodiment of the invention that is wider so that words or symbols can be printed on the faces of the pylon to convey information to the engineer. As with the previously described configuration, this embodiment comprises a pylon 37 having front and rear faces 38 and 39 respectively. The pylon 37 is generally tent shaped so that its faces angle upwardly and the ends of the pylon are closed by end plates 41 and 42 (42 not visible). A base in the form of a projecting flange 42 is formed at the bottom of the pylon and holes 43 are provided for anchoring the pylon to a cross tie or the like. Indicia 46 is provided and, in this embodiment, comprises words or other symbols that convey information to an engineer rather than the simple color signals of the previous embodiment. Preferably, the indicia of this embodiment is also fabricated of a retroreflective material to reflect the train's headlight directly back at the engineer so that the signal is bright, clear, and unambiguous. This embodiment is wider that the embodiment of FIG. 1 but is not so wide that is will not fit between the spaced rails of a railroad track. The rear face of this embodiment can also be used to convey information to engineers of trains traveling in the opposite direction just as with the embodiment of FIG. 1.

The invention has been described herein in terms of preferred embodiments and methodologies. It will be obvious to those of skill in this art, however, that variations can be made to the illustrated embodiments within the scope of this invention. For example, the pylons have been illustrated as being generally tent shaped with angled faces. However, other shapes are also possible. Further, the flanged base of the preferred embodiments could be replaced with other means for anchoring the pylon and the pylon itself could be formed of a wide variety of materials. These and other additions, deletions, and modifications might well be made by those of skill in the art without departing from the spirit and scope of the invention as set forth in the claims.

We claim:

1. A passive reflective signaling device for providing information to the engineer of a train as the train moves along a railroad track, said signaling device comprising a generally tent-shaped unitary pylon having a base and a body portion tapering upwardly from said base to an apex of said pylon, said pylon being formed of weather resistant material and said body portion of said pylon defining a front face, reflective visual indicia on said front face of said pylon for conveying preselected information to the engineer, and means for securing said pylon to the railroad track positioned so that the train passes over the pylon as it continues to move down the track, said pylon having a predetermined height sufficiently small to avoid contact with the train as the train passes over said pylon.

2. A signaling device as claimed in claim 1 and wherein said body portion of said pylon further defines a back face and wherein said back face is also provided with reflective indicia so that said signaling device can be used for conveying information to the engineer of a train moving along the railroad track in either direction.

3. A signaling device as claimed in claim 2 and wherein said front and back faces defined by said body portion are angled upwardly so that they can be seen easily by the engineer of an approaching train.

4. A signaling device as claimed in claim 3 and further comprising a cross tie supporting spaced apart railroad tracks, said pylon being mounted to said cross tie.

5. A signaling device as claimed in claim 4 and wherein said pylon is mounted to said cross tie between the rails of the railroad track.

6. A signaling device as claimed in claim 4 and wherein said pylon is mounted to said cross tie outside the rails of the railroad track.

7. A signaling device as claimed in claim 1 and wherein said indicia comprises a retroreflective material adapted to reflect the headlight of the train back to the engineer.

8. A signaling device as claimed in claim 1 and wherein said indicia comprises words.

9. A signaling device as claimed in claim 1 and wherein said pylon has a height selected to insure that said pylon extends upwardly to a position that is within a predetermined dead zone above the height of the rails of the railroad track.

10. A method of conveying information to the engineer of a train as the train moves along a railroad track, said method comprising the steps of:

(a) providing a unitary molded pylon having an upwardly angled face bearing passive reflective indicia containing information to be conveyed, said pylon having a predetermined height less than the distance between the railroad track and the bottom of the train; and (b) mounting the pylon to the railroad track in a region of the railroad track that the train passes over as it moves along the track with the face of the pylon being positioned to be presented to the engineer as the train approaches the pylon.

11. The method of claim 10 and wherein step (b) comprises mounting the pylon between the rails of the railroad track.

12. The method of claim 11 and wherein step (b) further comprises mounting the pylon to a cross tie of the railroad track.

13. The method of claim 10 and wherein step (b) comprises mounting the pylon outside the rails of the railroad track.

14. The method of claim 13 and wherein step (b) further comprises mounting the pylon to a cross tie of the railroad track.

* * * * *